Oct. 27, 1931.    R. R. GOBEREAU ET AL    1,829,443
PROPELLER
Filed June 29, 1928    6 Sheets-Sheet 4

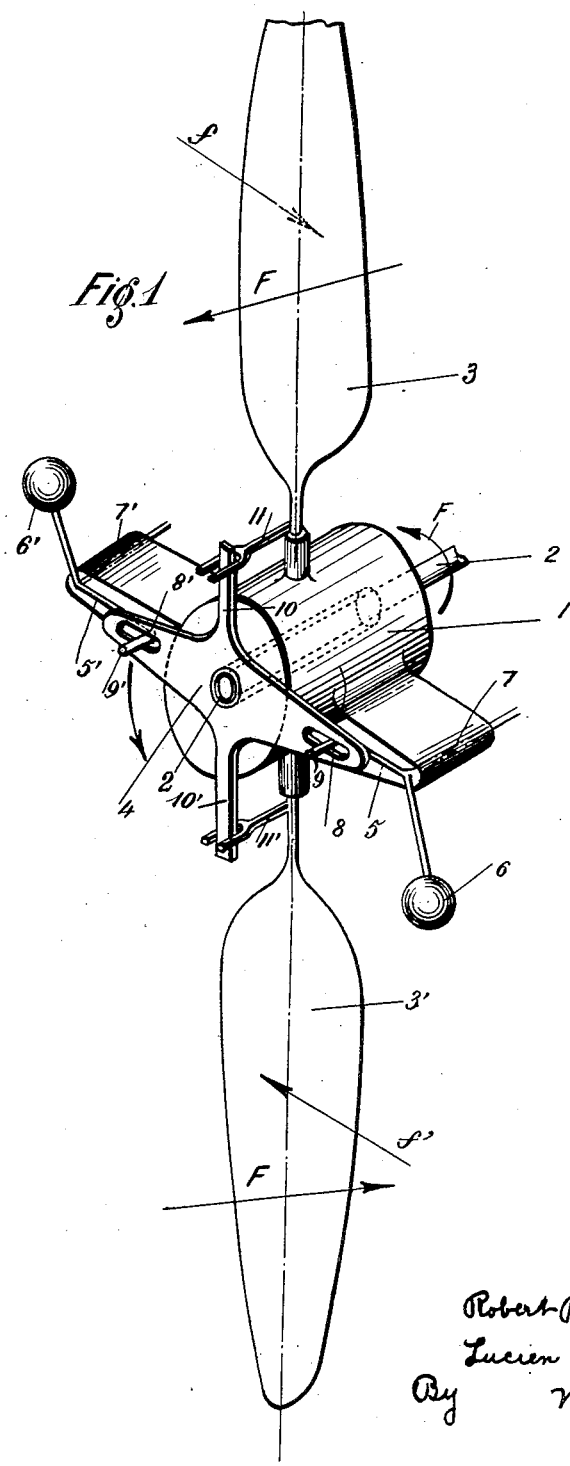

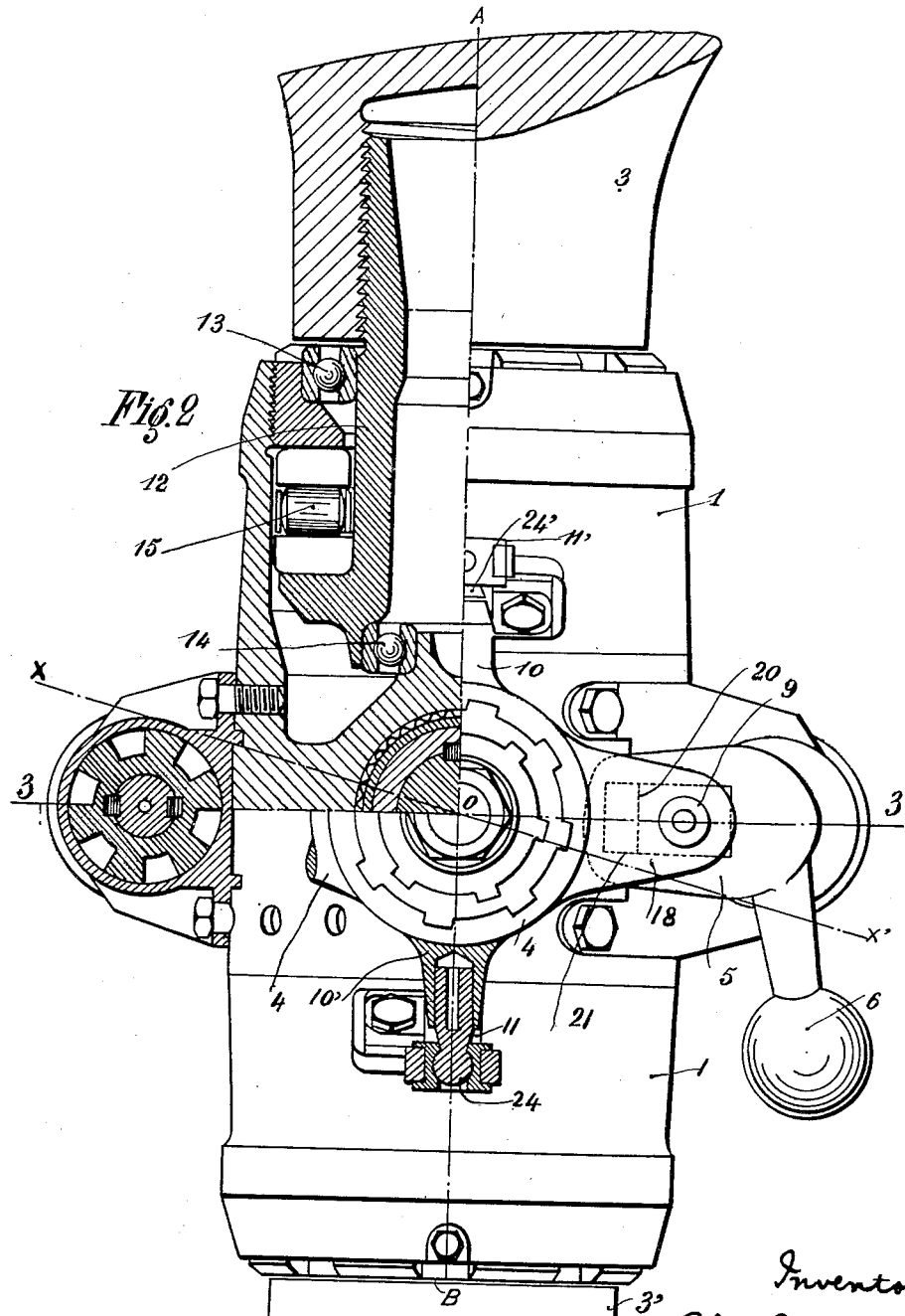

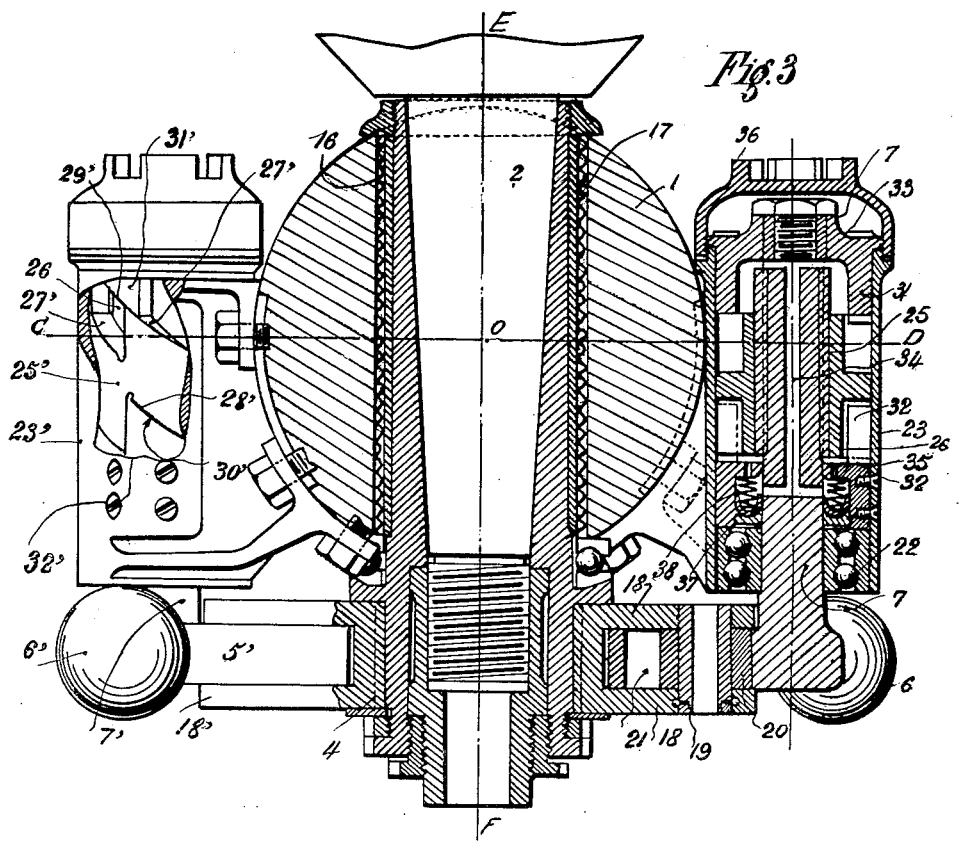
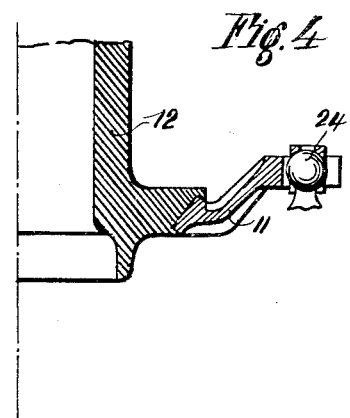

Inventors:
Robert Richard Gobereau
and
Lucien Edouard Maupole
By Munn & Lewis
Attorneys.

Oct. 27, 1931.  R. R. GOBEREAU ET AL  1,829,443

PROPELLER

Filed June 29, 1928   6 Sheets-Sheet 5

Inventors:—
Robert Richard Gobereau
and
Lucien Edouard Maujol
By Mauro + Lewis
Attorneys Oct. 27, 1931.  R. R. GOBEREAU ET AL  1,829,443
PROPELLER
Filed June 29, 1928  6 Sheets-Sheet 6

Patented Oct. 27, 1931

1,829,443

UNITED STATES PATENT OFFICE

ROBERT RICHARD GOBEREAU AND LUCIEN EDOUARD MAUJOLE, OF PARIS, FRANCE

PROPELLER

REISSUED

Application filed June 29, 1928, Serial No. 289,255, and in France July 2, 1927.

The present invention has for its object a propeller the pitch of which varies automatically so that the inclination of its blades is the optimum for all speeds of the aeroplane and of the engine.

In the case of a propeller with invariable pitch, the power of the motor is not utilized in the optimum manner. When the aeroplane is below its normal linear speed the inclination of the blades should be less than when it attains the maximum speed which the engine is capable of producing under the normal working conditions. At the time when the aeroplane starts it is necessary for the propeller to have a pitch such that, acting on the air which is stationary with respect to the aeroplane, it exerts the highest possible traction effect. In proportion as the speed of the aeroplane increases and as in consequence the aeroplane acts upon air which has a speed higher and higher relatively to the aeroplane it is necessary in order to utilize the engine most efficiently for the pitch of the propeller to increase progressively.

It has already been sought to resolve the problem by means of different systems employing the force of antagonistic springs or of centrifugal masses which directly affect the blades of the propeller so as to cause their pitch to alter as a function of the resistance of the air on the blades or of the speed of rotation, but, as is known, such devices only give an imperfect solution of the problem.

The present invention furnishes a solution which leaves nothing to be desired and which while assuring an automatic variation of the inclination of the blades with respect to the axis of the engine under the best conditions gives in addition at any given instant a high flexibility in the entrainment of the propeller.

The device which forms the object of the invention is essentially characterized by the fact that the blades of the propeller are mounted in an orientatable manner on a support which is entrained not directly by the shaft of the engine, but through the intermediary of one or more movable members submitted to the antagonistic action of centrifugal masses mounted on the support of the blades, the angular variations of the shaft of the engine with respect to the reactions of the centrifugal masses, or more simply with respect to the support, being utilized in order to cause the angle of inclination of the blades to vary by suitable connections, the centrifugal masses and the different connections between the movable members of the device being dimensioned and arranged so that the variable resistant couple of the propeller is brought at any instant to a value equal to and contrary in sign to the engine couple.

Thus, for a given engine having a given power under a certain speed of rotation, the centrifugal system gives rise to an antagonistic force apposite and equal to the engine couple, and to the resistance of the air on the blades so that the inclination of the blades is an optimum for all speeds of rotation of the engine for all the engine couples developed by it and for all speeds of the aeroplane.

The invention is in addition characterized by the combination with a propeller device having a variable pitch as defined above of shock absorbers intended to deaden the oscillations of the system and of a flexible connection between the engine shaft and the propeller to permit the latter to orientate itself suitably with respect to the said shaft with a view to effecting a differential compensation, equilibrating the thrusts of each blade.

Finally, the invention is likewise characterized by the combination with a propeller device of variable pitch as defined above of a system of high resistance stop or abutment with balls or sets of rollers in which the different elements are constituted in such a manner that when the bearing element (balls, cylindrical or tapered rollers) and the bearing races are subjected to a high thrust, a second element suitably arranged enters into play before the metal which contitutes the races or the bearing members has attained to its elastic limit in order to maintain practically constant the interval between the two races and consequently to prevent the thrust on the rolling elements from increasing. It also intervenes in order to increase the bearing surfaces.

The second element, may for example, be constituted by the cage itself, which is customarily interposed between the bearing elements in order to space them suitably, or in the special case of rollers, by a second roller arranged inside the bearing element which will have been hollowed out for this purpose.

The play between the auxiliary element which reinforces the resistance of the stop and the normal bearing element will be small and will depend on the elastic limit of the metals employed.

Not only the bearing element will become eased of the pressure upon it on account of the intervention of the auxiliary element but also the races will not have their work increased, this latter on account of the increase of the surfaces of contact resulting either from the direct bearing of the auxiliary element against these races or from the deformation of the bearing element itself before this deformation is limited by the intervention of the auxiliary element.

In the accompanying drawings and by way of example,

Figure 1 is a diagrammatic view illustrating the invention.

Figure 2 represents an elevation in part section of a method of construction of a propeller with variable pitch in accordance with the invention.

Figure 3 is a plan view in part section along 3—3 of Figure 2 and with part cut away.

Figure 4 is a detail view.

Figure 5:
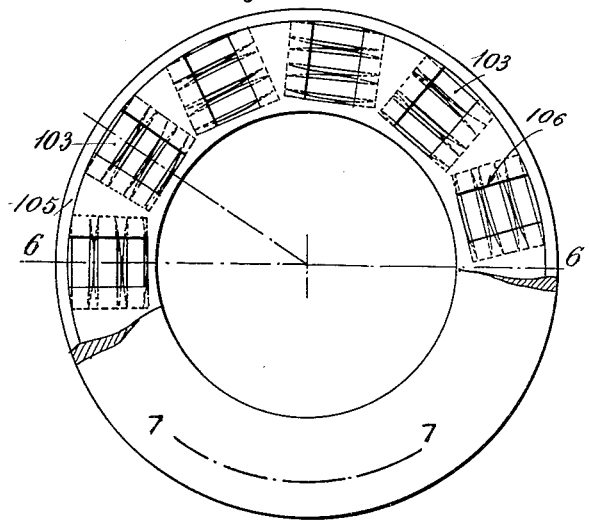
Figure 5 is a plan view of a stop in accordance with the invention, the upper race of which has been taken away.

As is seen in Figures 1 and 2 the device comprises a support 1 mounted loosely on the power transmitting shaft 2 of the engine and in which the blades 3, 3' of the propeller (having in this case two blades) can turn freely while being retained in place.

On the shaft of the engine is keyed a carrier or entraining member 4 connected to the arms of levers 5, 5' of two centrifugal masses 6, 6' capable of turning freely in the support on their axes 7, 7'. The connection between the carrier or entraining member 4 and the arms of levers 5, 5' is such that when these two members rotate about their axes there results a variation of the direction of application and a variation in length of the engagement of these members. In the drawings the carrier 4 has by way of example two guiding slots 8, 8' which co-operate with two lugs 9, 9' carried by the lever arms 5, 5'. The carrier is connected to the blades 3, 3' in such a manner that its angular displacements with regard to the support are translated into angular displacements of the blades. This is obtained in the drawings by the arms 10, 10' acting on arms 11, 11' fixed on the axles of the blades 3, 3'.

The action of the device is as follows:—

When the engine is started up in the direction of the arrow F the carrier 4 turns with it but the inertia of the support 1 and of the blades 3, 3' causes the arms 5, 5' to follow the movement of the carrier and at the commencement cause the masses 6, 6' to approach the axis 2. At the same time the arms 10, 10' cause the blades to turn on their axle and bring them to an inclination corresponding to that of a propeller with fixed blades, that is the minimum inclination. The aeroplane rising in flight, the thrust of the propeller is reduced on this account and there follows a reduction of the resistance couple of the propeller. The masses 6, 6' draw away from the centre and the carrier 4 takes up a larger angle with respect to the support 1 which has for its effect to increase the inclination of the blades and consequently to re-establish the value of the thrust of the propeller.

The distance of the centres of gravity of the masses 6, 6' with respect to the axis of the shaft 2 and the connections between the carrier 4 and these masses are dimensioned in such a manner that for a given speed of rotation of the engine the blades are inclined according to the optimum inclination for the resulting running and that the resistant couple of the propeller equilibrates exactly the couple of the motor. The variation in length between the axis of the shaft 2 and the lugs 9 on the one hand and the variation in direction of the application of the antagonistic forces on the other hand, influence progressively the action of the masses 6, 6' on the angular variations which are produced between the support 1 and the carrier 4 in order to compensate the variations of the tangential component of the force of the masses 6, 6' transmitted to the carrier 4.

In the form shown in Figures 2, 3 and 4, the support is constituted by a hub in which the blades 3, 3' are mounted by their axles such as 12, by ball bearings such as 13, 14 and a stop or retaining bearing with rollers, such as 15.

This hub as is seen from Figures 2 and 3 is traversed by the nose of the engine shaft which carries a sleeve 16. Between the sleeve 16 and the hub 1 is interposed a yielding filling 17 formed, for example, by a sleeve of rubber as indicated in Figure 3. This yielding filling insulates the hub 1 from vibration and consequently the blades of the propeller from the nose 2 of the engine shaft. It permits in addition an automatic centering of the masses of the propeller, thus avoiding critical points of rotation and assuring a differential equilibration of the thrusts and flexing movements of the blades.

On the end of the nose of the engine shaft 2 is fixed the carrier sleeve 16, for example, by grooves in the carrier 4.

This carrier or entraining member is provided with arms 18, 18', which form bearings and support axles, such as 19 on which can pivot blocks such as 20 which can slide in grooves or guides, such as 21, carried by the arms 5, 5' pivoted on the axles 7, 7' of the two centrifugal masses 6, 6'. The axles 7, 7' are mounted by means of ball bearings such as 22 in boxes 23, 23' fixed on the hub 1.

This system of entrainment could obviously be replaced by a reversible cam or by radiating variable gears giving the same variation of arm of levers and of direction of application of the forces as the device which has just been described.

Arms 10, 10' of the carrier (Fig. 2) act on the arms 11, 11' fixed on the axles 12, 12' of the blades 3, 3' of the propeller by jointed lugs 24, 24' (Figs. 2 and 4).

The action of the propeller thus constructed is the same as that of the diagrammatic device illustrated in Figure 1. The assemblage consisting of the blades 3, 3' of the hub 1 of the boxes 23, 23' of the axes 7, 7' and of the centrifugal masses 6, 6' centres itself automatically during rotation on the nose of the engine shaft 2 on account of the elastic sleeve 17. The application of the engine couple to the propeller is effected on the arms 5 of the centrifugal masses through the intermediary of the axes 9, 9' and blocks 20. The arm of the lever of the slider of the centrifugal system with respect to the point of application of the motive force on the axes 9, 9' varies in proportion as the angle, which the carrier 4 makes with respect to the hub 1, increases, this angle passing, for example, to the position X—X' of Figure 2. This variation in the length of the arm of the lever of the centrifugal system 5, 6, and the variation of the application of the antagonistic forces compensate for the variation of the component (of the tangential force of the centrifugal masses) which acts on the carrier in proportion as they draw away from the axis AOB.

In the form shown in Figures 2 and 3 the centrifugal masses are provided with liquid shock-absorbing devices which oppose the rapid movements (return, variation in running) of the mechanism.

Each of these liquid shock absorbers comprises in combination with the box 23, forming a cylinder, a species of cam 25 keyed to the axle 7, this cam being capable of sliding with slight friction on the said axle and in the cylinder 23. The cam, as can be seen from the cam 25' in Figure 3, carries helicoidal steps such as 27', 28' which when the axle 7 rotates screw themselves on the steps 29', 30' carried by the fixed portions 31, 31', 32, 32'. When in Figure 3 the axles 7, 7' rotate in the opposite direction to the hands of a watch, the cams 25, 25' tend to be displaced towards the bottom of the cylinder and conversely. The axle 7 is pierced with channels 33, 34, 35 which cause the two faces of the cam 25 to communicate. When the axle 7 tends to rotate, liquid, for example oil, which fills all the free cavities in the interior of the chambers 26 is forced to pass from the back face to the front face of the cams 25, 25' and conversely, by traversing the channels 33, 34, 35. These channels being small, the liquid can only move with a reduced velocity which brakes displacements of the cams 25, 25' and consequently of the axles 7, 7'. The limit of variation of the cams 25, 25' and consequently of the axles 7, 7' is attained when the cams 25, 25' abut at the bottom in front or behind. This limitation of angular position of the axes 7, 7' determines the maximum angle through which the carrier 4 is capable of being displaced with respect to the hub 1. It is this maximum angle of displacement which is indicated by the line X—X' of Figure 2.

In order to avoid any abrupt contact of the cams 25, 25' at the end of the course, the channels 33 and 35 are obstructed progressively at the end of the course by cams 25, 25'. The free section of the channels 33 and 35 then diminishes at this moment, finally becoming zero.

The fluid tightness of the shock absorber is assured at the back by a stopper 36 and in front by a leather stamping 37 influenced initially by the spring 38 and so that the liquid in the shock absorber tends to press more against the axles 7, 7′ and against the cams 32, 32′.

In Figures 5, 6, 7, 8, 9, 10, 11, 12, 13, 14, 15, 16, 17, 18, 19 and 20 is illustrated the particular type of the stop or abutment employed by preference in combination with the propeller described above.

Figure 6:
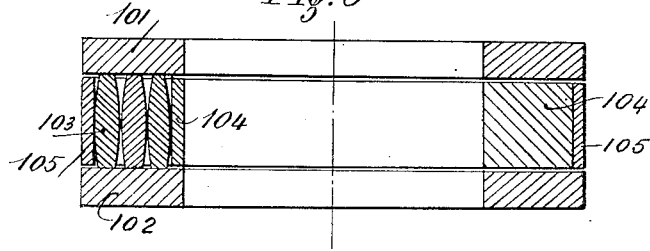
Figure 6 is a transverse section through 6—6 of Figure 5.
Figure 7:
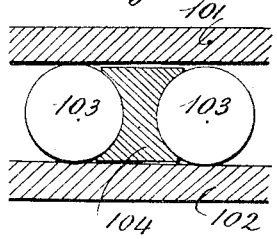
Figure 7 is a circular developed section through 7—7 of Figure 5.
Figure 8:
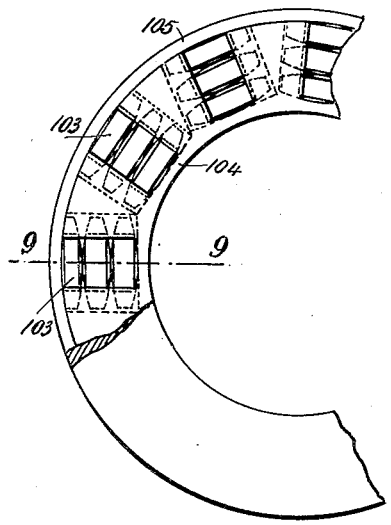
Figure 8 is an analogous view of Figure 5 of a modification.

In the form shown in Figures 5 to 7 the stop comprises bearing races 101 and 102 and cylindrical rollers such as 103 interposed between these two races. A cage 104 comprises cylindrical hollows in which the rollers are situated. It is provided with an exterior ring 105 which closes the hollows and encloses the rollers. The cage 104 and its exterior ring 105 having a height less than the diameter of the rollers 103, these rollers project at the upper portion and at the lower portion of the cage through windows such as 106.

The play between the cage 104 and the bearings 101 and 102 is calculated in such a manner, given the elastic limit of the metals which comprise these races and the rollers 103, that, in the case of high load, the races come to rest against the cage 104 before the metal of the rollers and of the races has exceeded its elastic limit.

It will be understood that on account of this device the elastic limit of the rollers 103 will never be exceeded and when a load is concerned which would have been too great without this device, to prevent permanent deformation of the rollers 103 and of the races 104, the force exerted on the stop will be supported at the same time by the rollers 103 and by the cage 104, this latter opposing any greater diminution of the diameter of the rollers. The friction will be exerted at the same time in the form of friction of the race against the roller and in the form of sliding friction against the cage, the force being supported by these elements.

Figure 11:
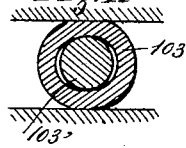
Figure 11 is a view of the bearing element and of the auxiliary element under high load.

In the form of the invention illustrated in Figures 8, 9, 10 and 11, the rollers 103 are hollowed on the inside and contain smaller rollers 103′. The difference in diameter between the hollow in the rollers 103 and the rollers 103′ is essentially smaller than the play which exists between the races and the cage 104 so that when the force which is exerted on the stop is sufficient for the rollers 103 to be deformed to the point of reducing to zero, the play between the interior hollow of these rollers 103 and the auxiliary element 103′ as this is illustrated in Figure 11, the races will not come in contact with the faces of the cage 104. In this case the rollers 103 become deformed as indicated in Figure 11 and come to rest on the auxiliary element 103′ which prevents their further deformation. On account of the deformation of the rollers 103, the surface of contact between these rollers and the races 101 and 102 increases and prevents permanent deformation of these races. The deformation of the rollers 103 will be the more easy as the difference between their interior and exterior diameter is smaller.

By way of modification it will be possible to adjust the intervals comprised between the cage 104 and the races so that if, under the effect of very high loads, the auxiliary element 103′ should tend to be deformed to such an extent that the elastic limit of the metal which comprises it is on the point of being reached, the interval in question becomes zero and that the races as indicated in the example of Figures 5, 6 and 7, come to rest on the upper and lower surfaces of the cage so as to oppose any final approaching of the two races and in consequence any final subsequent deformity of the rollers 103 and of the interior cores 103′.

Instead of giving the races a plane form it will be possible to give them the form of annular steps, the rollers having corresponding diameters.

Figure 12:
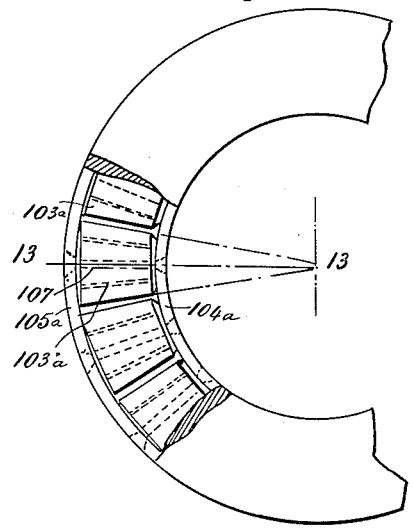
Figure 12 is a view in plan analogous to Figure 5 of another variation.
Figure 9:
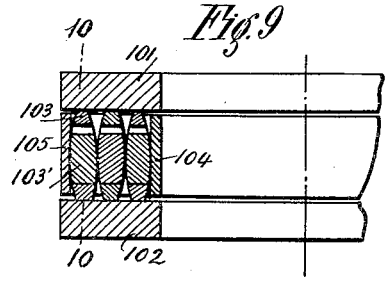
Figure 9 is a transverse section through 9—9 of Figure 8.
Figure 13:
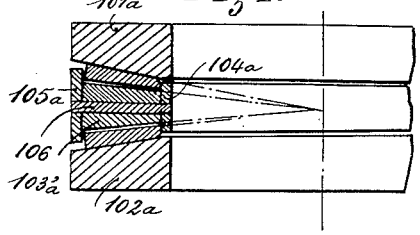
Figure 13 is a section through 13—13 of Figure 12.
Figure 10:
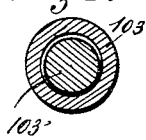
Figure 10 is a section through 10—10 of Figure 9 showing a bearing element with its auxiliary interior reinforcing element.
Figure 14:
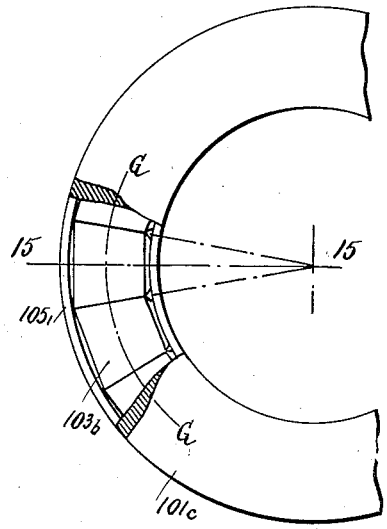
Figure 14 is a part front view with part cut away of another variation.
Figure 17:
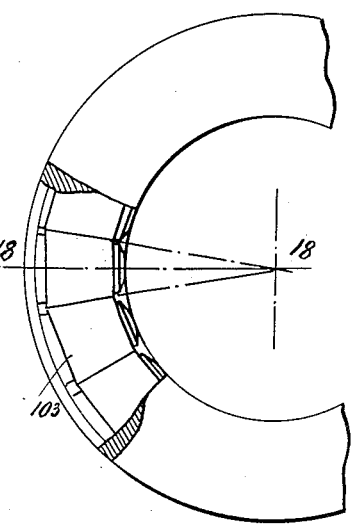
Figure 17 is a view in part plan of another variation.

The example illustrated in Figures 12 to 14 is in principle the same as that of Figures 8, 9, 10 and 11, except that instead of cylindrical rollers conical rollers are used. Corresponding members are represented with the same indices followed by the letter $a$.

The conical rollers are placed on axes 106 held at their extremities in the cage 104$a$ and in the exterior ring 105$a$.

Figure 15:
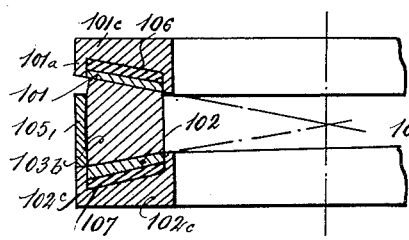
Figure 15 is a section through 15—15 of Figure 14.
Figure 18:
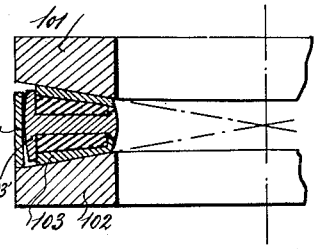
Figure 18 is a section through 18—18 of Figure 17.
Figure 16:
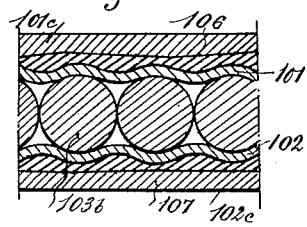
Figure 16 is a developed circular section through G—G of Figure 14, the bearing being under high load.
Figure 19:
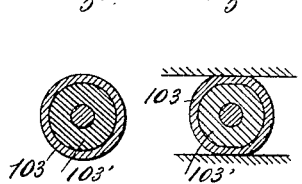
Figure 19 is a transverse section of a conical roller bearing of Figure 17 under normal load.
Figure 20:
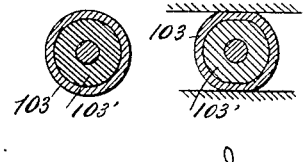
Figure 20 is a analogous section under high load.

In the modification represented in Figures 14, 15 and 16 the stop before the elastic limit of the metal is exceeded is obtained as in the modification in Figures 5 to 7 by the ring 104 which encircles the conical rollers 103$b$, in contact with which under high load come the edges 101$b$, 102$b$ of the boxes 101$c$ and 102$c$ which contain the races 101, 102. These races are here constituted by thin rings capable of sinusoidal deformation in consequence of the fact that the annular sheets 106, 107 of rubber or analogous material are interposed between them and the boxes 101$c$, 102$c$. This deformation gives an increased surface of contact between the rollers and the races and diminishes the fatigue of the metal.

In the other modification represented in Figures 17 to 20 the hollow conical rollers 103 are filled or almost filled with rubber 103′. Under high load the rollers 103 become flattened, but the rollers being incompressible they cannot become deformed above a certain limit. This limit can be made very wide as the walls of the rollers can be made very thin, the metal ceasing to resist bending when the rubber has been compressed. The contact surface increases on account of this deformation.

The cage 104 then intervenes in order to limit the approach of the races 101 and 102, and to prevent deformation of the rollers.

What we claim is:—

1. A variable pitch propeller comprising, in combination with a power shaft, a hub or support rotatably mounted upon said shaft, propeller blades orientatably mounted on said hub, an entraining member secured to the shaft, centrifugal masses pivotably mounted on said hub and variably connected to said entraining member whereby the radial displacement of the centrifugal masses controls the angular displacement of the entraining member with relation to the said hub, and means for connecting said entraining member and said orientatable blades so as to vary the blade pitch when said angular displacement occurs,—all said means being arranged so as to maintain a substantially constant balance between the resisting couple of the propeller and the engine torque.

2. In a propeller as claimed in claim 1 a leverage system interposed between the said entraining member and the centrifugal masses so designed that the mechanical effect varies in proportion to the angular displacement between the said support and the said entraining member.

3. In a propeller as claimed in claim 1 supports connected to the hub, axes upon which the centrifugal masses are mounted which axes are capable of rotation in the said supports, a connection such as pivoting members and sliders between the axes of the centrifugal masses and the entrainer and a connection between the entrainer and the axes of the propeller blades such that the displacements of the entraining member and therefore those of the centrifugal masses relatively to the hub shall be translated into angular displacements of the blades about their axes.

4. In a propeller as claimed in claim 1 shock absorbers for the axles of the centrifugal masses such as cams having helicoidal steps and keys sliding on the said axles, cylinders, fixed steps and channels for the passage of liquid wherewith the said cams cooperate, the rotation of the axes of the centrifugal masses being adapted to cause longitudinal displacement of the cams and a transfer from one face of said cams to the other of liquid contained in the said cylinders.

5. In a propeller as claimed in claim 1, shock absorbers for the axles of said centrifugal masses such as cams having helicoidal steps and keys sliding on said axles, cylinders, fixed steps, channels for the passage of liquid wherewith said cams cooperate, the rotation of said axles causing longitudinal displacement of said cams and a transfer from one face of said cams to the other of liquid contained in the cylinders, and means whereby the cams are caused to obstruct said channels at the end of their travel.

In testimony whereof we have affixed our signatures.

ROBERT RICHARD GOBEREAU.
LUCIEN EDOUARD MAUJOLE.